US008103151B2

(12) United States Patent
Kogure et al.

(10) Patent No.: US 8,103,151 B2
(45) Date of Patent: Jan. 24, 2012

(54) INFORMATION RECORDING APPARATUS

(75) Inventors: Takashi Kogure, Kawasaki (JP); Youji Kimura, Kawasaki (JP); Yasuhiko Isobe, Kawasaki (JP); Hiroyuki Taguchi, Kawasaki (JP); Shoichi Haijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 599 days.

(21) Appl. No.: 12/354,922

(22) Filed: Jan. 16, 2009

(65) Prior Publication Data
US 2009/0185787 A1    Jul. 23, 2009

(30) Foreign Application Priority Data

Jan. 17, 2008    (JP) .................................. 2008-008163

(51) Int. Cl.
H04N 5/76    (2006.01)
(52) U.S. Cl. ........................................ 386/291; 386/296
(58) Field of Classification Search .................. 386/291, 386/296, 293, 297, 326
See application file for complete search history.

(56) References Cited

U.S. PATENT DOCUMENTS
2009/0103894 A1 *  4/2009  Yamashita ...................... 386/83

FOREIGN PATENT DOCUMENTS
JP    2004-112622    4/2004

* cited by examiner

Primary Examiner — Robert Chevalier
(74) Attorney, Agent, or Firm — Fujitsu Patent Center

(57) ABSTRACT

An information recording apparatus includes a registration unit that registers scheduling information to schedule single recording of information provided periodically; a recording unit that records the information on a recording medium based on the registered scheduling information; a counting unit that counts the number of times of registering the scheduling information of the information; a determination unit that determines whether the number of times of registering the scheduling information of the information exceeds a predetermined threshold value; and a registering unit that generates, when the number of times of registering the scheduling information of the information exceeds the predetermined threshold value, repeated scheduling information to enable the recording unit to periodically and repeatedly record the information, and registers the repeated scheduling information in the registration unit.

5 Claims, 5 Drawing Sheets

FIG. 3

SCHEDULING REGISTRATION HISTORY LIST

| RECORD NUMBER | DATE AND TIME | DAY OF WEEK | GENRE | Ch | PROGRAM NAME (PROGRAM ID) |
|---|---|---|---|---|---|
| 0 | yyyy.mm.dd | MON. | DRAMA | 011 | TITLEA |
| 1 | yyyy.mm.dd | TUE. | VARIETY | 041 | TITLEB |
| 2 | yyyy.mm.dd | MON. | DRAMA | 011 | TITLEA |
| 3 | yyyy.mm.dd | FRI. | SPORTS | 081 | TITLEC |

PRESCRIBED NUMBER OF TIMES ACCORDING TO GENRE INFORMATION (THRESHOLD VALUE LIST)

| PRESCRIBED NUMBER OF TIMES (THRESHOLD VALUE) | GENRE NAME |
|---|---|
| TWICE OR MORE | DRAMA, MOVIE |
| THREE TIMES OR MORE | ANIMATION, SPORTS |
| FOUR TIMES OR MORE | VARIETY |
| FIVE TIMES OR MORE | NEWS/REPORT |

INFORMATION RECORDING APPARATUS

BACKGROUND OF THE INVENTION

The disclosures made herein relate to an information recording apparatus which enables scheduling of periodic recording of information such as audio or video.

There has conventionally been available an information recording/reproducing apparatus such as a video tape recorder (VTR), a DVD recorder, or a hard disk recorder which enables scheduled recording of a television broadcast program (television program). In the information recording/reproducing apparatus of this type, a user operates the information recording/reproducing apparatus to set (register) scheduling information containing designation of a recording target channel or a time window in the information recording apparatus (scheduling setting). Then, when the time of starting recording arrives, the information recording/reproducing apparatus is activated based on the scheduling information to automatically record a designated channel program until recording end time. When the recording ends, the scheduling information is automatically deleted.

Television programs include a serial program (such as serial drama) which is broadcast periodically, for example, every day or every week. To deal with recording of such a serial program, an information recording/reproducing apparatus has been developed, which can carry out setting to repeat scheduled recording at a cycle such as every day or every week (repeated scheduled recording setting). In this information recording/reproducing apparatus, once information for repeated scheduled recording setting (hereinafter, referred to as "repeated scheduling information") is set (registered), the repeated scheduling information is not deleted after execution of one automatic recording operation. The information recording/reproducing apparatus periodically carries out repeated scheduled recording at the set cycle. Thus, the user does not have to carry out cumbersome work such as setting of scheduling information for each broadcasting of the serial program.

The following is a related art to the present invention.
[Patent document 1] Japanese Patent Laid-Open Publication No. 2004-112622

It is up to user's judgment whether to carry out "one-time (single)" scheduled recording setting or repeated scheduled recording setting as described above. In a situation where the user is not knowledgeable about an operation of the information recoding/reproducing apparatus, the user may know only a single scheduled recording setting method corresponding to a basic operation, and may not know presence of the repeated scheduled recording setting.

The user who only knows the single scheduled recording setting method has had to repeat, in the case of recording and viewing a certain recorded serial program, single scheduled recording setting for each broadcasting time of the serial program. Thereafter, when finding out the presence of the repeated scheduled recording setting, the user has had to cancel the registered single scheduled recording setting to carry out repeated scheduled recording setting anew. This situation has created a possibility of complicating work for the user.

On the other hand, to prevent forgotten recording of a program, execution of repeated scheduled recording setting is effective. Thus, the repeated scheduled recording setting may be employed in initial setting of scheduled recording. However, the repeated scheduled recording setting is valid only as long as the user does not carry out an operation of canceling the registered repeated scheduled recording setting. Consequently, when the user forgets about the repeated scheduled recording setting, unnecessary scheduled recording may be continued, thereby blocking efficient use of a recording area of a recording medium (e.g., hard disk), and causing wasteful power consumption due to the unnecessary scheduled recording.

SUMMARY OF THE INVENTION

An object of the disclosures made herein is to provide a technology capable of reducing a load of learning a scheduled recording operation on the user.

According to a first aspect of the disclosures made herein, an information recording apparatus includes a registration unit that registers scheduling information to schedule single recording of information provided periodically; a recording unit that records the information on a recording medium based on the registered scheduling information; a counting unit that counts a number of times of registering the scheduling information of the information; a determination unit that determines whether the number of times of registering the scheduling information of the information exceeds a predetermined threshold value; and a registering unit that generates, when the number of times of registering the scheduling information of the information exceeds the predetermined threshold value, repeated scheduling information to enable the recording unit to periodically and repeatedly record the information, and registers the repeated scheduling information in the registration unit.

According to a second aspect of the disclosures made herein, a method of registering repeated scheduling information performed by an information recording apparatus that records information on a recording medium includes registering scheduling information to schedule single recording of the information provided periodically; recording the information on the recording medium based on the registered scheduling information; counting a number of times of registering the scheduling information of the information; determining whether the number of times of registering the scheduling information of the information exceeds a predetermined threshold value; and generating, when the number of times of registering the scheduling information of the information exceeds the predetermined threshold value, repeated scheduling information to periodically and repeatedly record the information, and registering the repeated scheduling information.

According to a third aspect of the disclosures made herein, a computer readable medium storing a computer program to be executed by a computer, the computer program executing the steps of registering scheduling information to schedule single recording of information provided periodically; recording the information on a recording medium based on the registered scheduling information; counting a number of times of registering the scheduling information of the information; determining whether the number of times of registering the scheduling information of the information exceeds a predetermined threshold value; and generating, when the number of times of registering the scheduling information of the information exceeds the predetermined threshold value, repeated scheduling information to periodically and repeatedly record the information, and registering the repeated scheduling information.

According to the first to third aspects, when the number of times of registering the scheduling information of the information exceeds the threshold value, the repeated scheduling information to periodically and repeatedly record the information is generated to be registered. Thus, a user is relieved of cumbersome work such as registration of scheduling information each time information is provided.

According to the third aspect, a configuration can be employed where the information contains type information, and in the step of determining, by using one of a plurality of threshold values prepared according to the type information of the information, whether the number of times of registering exceeds the one of the threshold values is determined. The information can contain, for example, video information of a program of television broadcasting. In this case, as type information, for example, information indicating a genre of the program can be employed. This configuration is also applicable to the first and second aspects.

The disclosures made herein can provide a technology capable of reducing the load of learning the scheduled recording operation on the user.

BRIEF DESCRIPTION OF THE DRAWINGS

FIG. 3 is a diagram illustrating an example of a scheduling registration history list;

FIG. 4 is a diagram illustrating an example of a threshold value list;

DETAILED DESCRIPTION OF THE PREFERRED EMBODIMENTS

Figure 1:
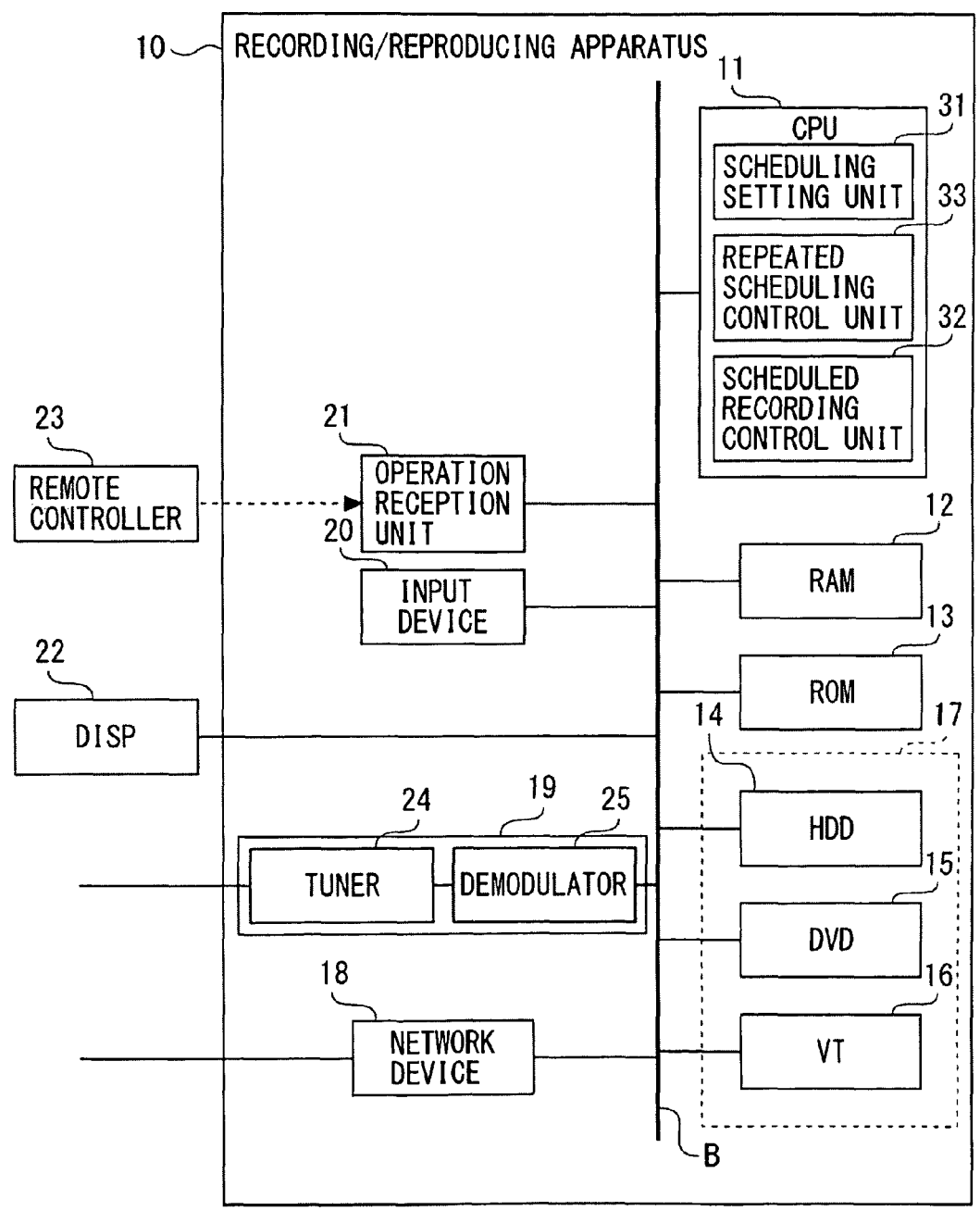
FIG. 1 is a diagram illustrating a configuration example of an information recording apparatus according to an embodiment of the disclosures made herein.

The embodiment of the disclosures made herein will be described below referring to the drawings. A configuration of the embodiment described below is only exemplary, and thus the present invention is not limited to the configuration of the embodiment.

FIG. 1 illustrates a configuration example of an information recording/reproducing apparatus of an embodiment of the disclosures made herein. FIG. 1 illustrates a composite-type information recording/reproducing apparatus 10 (hereinafter, referred to as "recording/reproducing apparatus 10") which is an information recording apparatus. The recording/reproducing apparatus 10 can record a television program and reproduce the recorded program on a plurality of types of recording media such as a hard disk (HD), a DVD, and a video tape (VT). The recording/reproducing apparatus 10 can also record and reproduce a program downloaded via a network.

Specifically, the recording/reproducing apparatus 10 includes a central processing unit (CPU) 11 which is a controller (processor), a main memory such as a random-access memory (RAM) 12 used as a work area of the CPU 11, a read-only memory (ROM) 13, a hard disk drive (HDD) 14, a device 15 that writes/reads data on a DVD (hereinafter, referred to as "DVD drive 15"), a device 16 that writes/reads data on a video tape (hereinafter, referred to as "video tape (VT) drive 16"), a network device 18 such as a LAN card, a receiver 19 that receives a television broadcasting wave (television broadcasting signal), an input device 20, and an operation reception unit 21. These pluralities of units are interconnected via a bus B. In the recording/reproducing apparatus 10, a display device 22 is connected to the bus B via an interface (not shown).

At least one of the ROM 13 and the HDD 14 stores various programs such as an operating system (OS), a BIOS, a device driver, and an application program, and data used for executing each program. The CPU 11 loads the respective programs on the RAM 12 to execute them, thereby realizing various functions of the recording/reproducing apparatus 10, such as a recording function, a recording scheduling function (including registration or deletion of scheduling information), a deletion function of recorded data, and a reproduction function of video or audio.

The recording/reproducing apparatus 10 is operated by manually operating the input device 20 or a remote controller 23. The input device 20 and the remote controller 23 include buttons and keys to enter setting information for realizing various functions of the recording/reproducing apparatus 10. Operation information (setting information) entered from the input device 20 is transmitted to the CPU 11. The remote controller 23 can transmit the operation information entered to the remote controller 23, via, for example, infrared-ray communication, to the operation reception unit 21. The operation reception unit 21 transmits the operation information to the CPU 11. The CPU 11 controls operations of the units according to the operation information, respectively, to realize the various functions. The CPU 11 can display, according to an operation of the input device 20 or the remote controller 23, a screen for guiding entry of the operation information on the display device 22.

The receiver 19 includes a tuner 24 and a demodulator 25, and is controlled by the CPU 11. A television broadcasting signal received by an antenna (not shown) is entered to the receiver 19, and a channel is selected by using the tuner 24. The receiver 19 carries out demodulation by using the demodulator 25 according to a broadcasting signal of the selected channel to generate a video signal (including audio signal and control signal). The generated video signal is transmitted to the display device 22 via the bus B, and the display device 22 displays and outputs video and audio based on the video signal. Thus, a user can view television broadcasting. The channel selection by the tuner 24 is controlled by the CPU 11 according to operation information entered by the user.

As described above, the recording/reproducing apparatus 10 includes a recording/reproducing unit 17 which includes a plurality of drives for the plurality of types of recording media, such as the HDD 14, the DVD drive 15, and the VT drive 16, and can record a television broadcasting program received by the receiver 19 by an optional drive (recording medium (HD, DVD or video tape)) designated by the user.

The CPU 11 carries out recording according to recording operation information (recording instruction) entered by the user. The CPU 11 converts, after reception of the recording instruction, a video signal output from the receiver 19 at this time into a signal (compressed moving image data (including audio and control information)) compliant with a recording format of a recording medium designated by the user as occasion demands, and supplies the signal to the designated drive (one of HDD 14, DVD drive 15, and VT drive 16) via the bus B. The designated drive records (stores) the compressed moving image data on a recording medium of its own apparatus.

The CPU 11 reproduces the information according to the operation information of the reproduction instruction entered by the user. In other words, after reception of the reproduction instruction (including designation of recording medium, and designation of data to be reproduced (recorded program)) entered by the user, the CPU 11 instructs a corresponding drive to read desired data to be reproduced, and converts the compressed moving image data read from the drive into a video signal compliant with the display device 22 when necessary to supply it to the display device 22. Thus, the user can view a reproduced video displayed on the display device 22.

The display device 22 may be a television receiver which includes a tuner and a demodulator. In this case, by allowing antenna entry of data (television broadcasting signal) to the display device 22, the user can view a desired program by the display device 22 alone. In this case, the user can view another program on the display device 22 while recording a program of a channel selected by the receiver 19 of the recording/reproducing apparatus 10.

The CPU 11 carries out scheduled recording setting of a program according to operation information (scheduling information) which the user has entered by operating the input device 20 or the remote controller 23. Scheduled recording setting where the number of recording times is one (single scheduled recording setting) will be described below.

When wishing for single scheduled recording setting, the user operates the input device 20 or the remote controller 23 to enter an instruction of displaying a scheduled recording setting screen. Then, the CPU 11 displays the scheduled recording setting screen including a program list on the display device 22 according to the instruction of displaying the scheduled recording setting screen.

Program list data is contained in, for example, a television broadcasting signal. When necessary, the CPU 11 can obtain the program list data to display it on the display device 22. The obtained program list data is stored in a storage area prepared on the RAM 12 or the HDD 14 and is updated when necessary.

The program list data is list data of a plurality of programs broadcast from each television station within a prescribed period, which contains attribute data such as channel numbers, channel reception frequencies, program ID's, program titles, broadcast dates and time (broadcast year-month-day, day of week, and broadcast time window), program genres, and information indicating that a program is final, of respective broadcast programs. The user refers to the program list on the scheduled recording setting screen to carry out scheduled recording setting of a program desired to be viewed. In this scheduled recording setting, the user designates a program desired to be recorded. For respective broadcast programs (information) of a serial program periodically broadcast every day or week, program list data is provided where, while contents vary from one broadcast day to another, identical program ID's are added, and program titles identical in contents in at least some parts are added.

Then, the CPU 11 extracts attribute data of a designated program from the program list data, and registers scheduling information containing this attribute data in a scheduling information storage area formed beforehand on the RAM 12 or the HDD 14. The RAM 12 and the HDD 14 function as a registration unit that registers scheduling information. The broadcast date and time contained in the attribute data are registered as scheduling date-time information (scheduled recording day (year-month-day and day of week), and recording time window (recording start time and end time). The CPU 11 adds a management number as identification information to the scheduling information registered in the scheduling information storage area.

Subsequently, based on the registered scheduling information, the CPU 11 records a designated channel program (video information (containing audio)) on a designated recording medium at a designated date and time.

Though not described in detail, the recording/reproducing apparatus 10 has a function of executing repeated scheduled recording setting. The user can carry out repeated scheduled recording setting by operating the input device 20 or the remote controller 23. The user can delete (cancel) registration of repeated scheduling information regarding the repeated scheduled recording setting by operating the input device 20 or the remote controller 23.

The recording/reproducing apparatus 10 of the embodiment has a repeated scheduled recording automatic setting function of switching, when the single scheduled recording setting as described above is carried out, in consideration of a scheduled recording setting situation, the single scheduled recording setting (single scheduling information registration) to repeated scheduled recording setting (repeated scheduling information registration).

Figure 2:
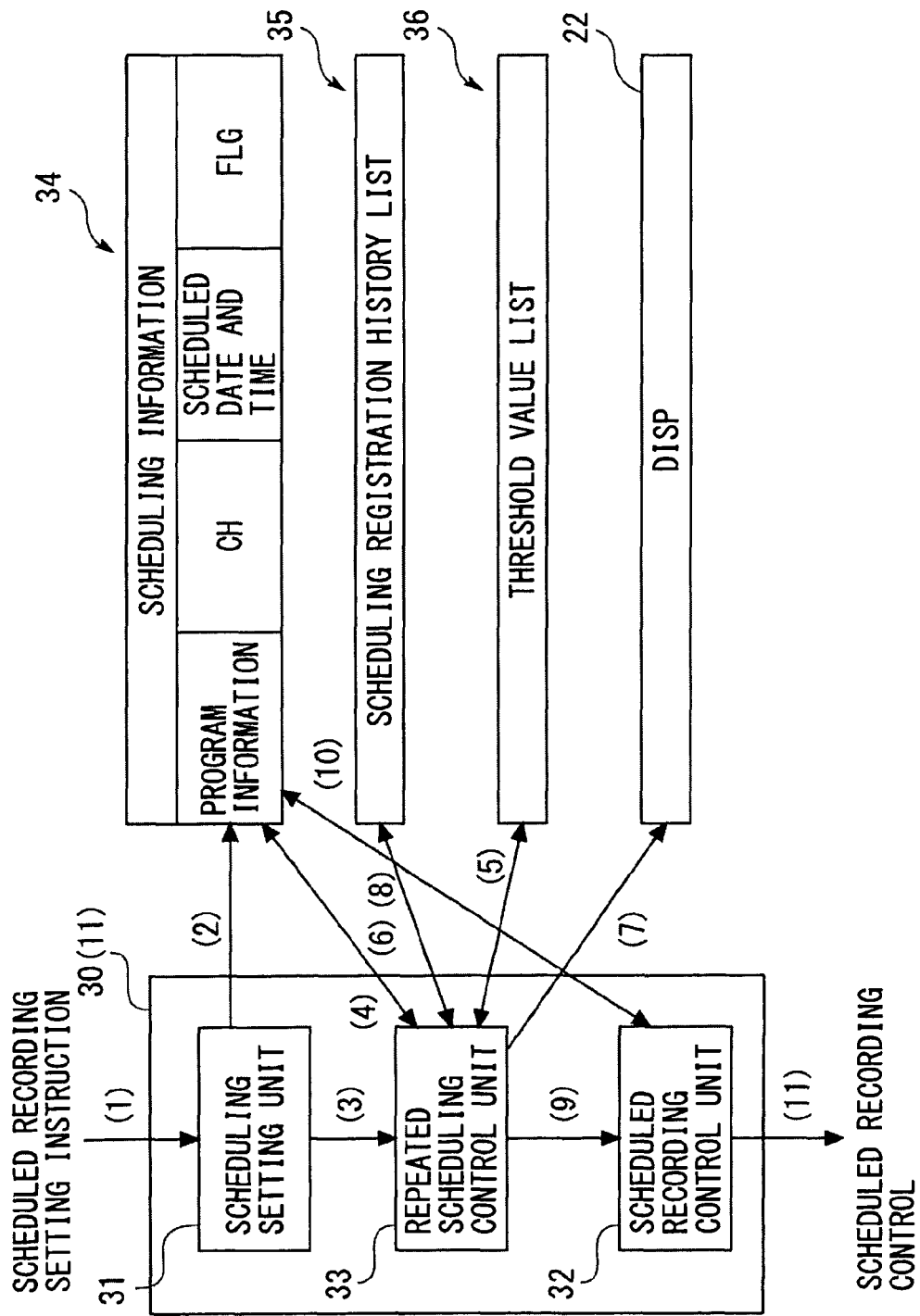
FIG. 2 is a diagram for explaining a repeated scheduled recording automatic setting function in the information recording apparatus.

FIG. 2 is a diagram schematically illustrating the repeated scheduled recording automatic setting function. In FIG. 2, by executing an application program 30, the CPU 11 can function as a device which includes a scheduling setting unit 31, a scheduled recording control unit 32, and a repeated scheduling control unit 33.

The scheduling setting unit 31 generates scheduling information (including repeated scheduling information) according to a scheduled recording setting instruction from the user to register it in the scheduling information storage area. One or more entries of scheduling information are stored in the scheduling information storage area.

FIG. 2 schematically illustrates entries of scheduling information 34. The entries of the scheduling information can include program information, a channel number (CH), scheduling date-time information, and a flag (FLG). The program information contains program identification information such as a program ID and all or some of program titles and information to indicate a program genre. Broadcasting reception frequency can be used in place of the channel number. The scheduling date-time information is for specifying a recording date and time (year-month-day, day of week, or recording time window).

The flag is an identifier to indicate which of "SINGLE RECORDING", "EVERY DAY RECORDING", and "EVERY WEEK RECORDING" the scheduling information is. For example, in a 2-bit state, which of the recording formats is employed can be identified. For example, "SINGLE RECORDING" can be represented by "00", "EVERY DAY RECORDING" can be represented by "01", and "EVERY WEEK RECORDING" can be represented by "10". Such an entry of a flag state indicating "EVERY DAY RECORDING" or "EVERY WEEK RECORDING" corresponds to an entry of repeated scheduling information. Reference to the flag enables discrimination from single scheduling information (single recording). The flag is controlled by the CPU 11 (scheduling setting unit 31 or repeated scheduling control unit 33).

The scheduled recording control unit 32 controls, based on entry contents of the scheduling information registered in the scheduling information storage area, the receiver 19 or the recording/reproducing unit 17 to record a designated program of a designated channel on a designated recording medium at a designated date and time. After an end of the recording, the scheduling setting unit 31 deletes the entries of the scheduling information of single recording from the scheduling information storage area.

The repeated scheduling control unit 33 determines, when single scheduled recording setting is carried out, whether or not to switch the scheduled recording setting to repeated scheduled recording setting. The repeated scheduling control unit 33 carries out the determination process by referring to a scheduling registration history list 35 (FIG. 3) or a threshold value list 36 (FIG. 4). The scheduling registration history list 35 and the threshold value list 36 are created in a prescribed storage area of the RAM 12 or the HDD 14.

FIG. 3 illustrates an example of the scheduling registration history list 35. The scheduling registration history list 35 holds at least registration history of scheduling information records registered via single scheduled recording setting. As information to specify the scheduling information, a date and time (year-month-day), day of week, genre, channel number, and program title (or program ID) of the scheduling information are stored.

According to the scheduling registration history list 35, based on genres, channel numbers, and program titles of the respective records stored in the scheduling registration history list 35, the records of the list can be grouped. For example, in the case of the example shown in FIG. 3, records having a genre "DRAMA", a channel number "011", and a program name "TITLE A" can be specified as one group regarding identical or associated pieces of scheduling information. The number of records of the group can be counted as the number of registered identical or associated pieces of scheduling information. The repeated scheduling control unit 33 (CPU 11) executes such counting.

FIG. 4 illustrates an example of the threshold value list 36. In the threshold value list 36, a genre of a program of a repeated scheduling control target and a plurality of prescribed numbers of times according to a genre type of the program are registered. This prescribed number of times corresponds to a threshold value for switching single scheduled recording setting to repeated scheduled recording setting. In FIG. 4, for a drama and a movie, prescribed numbers of times (threshold values) are set low because of high program seriality (plot). On the other hand, for "NEWS" and "REPORT", prescribed numbers of times are set high because of low seriality. Thus, threshold weighting based on genres enables prevention of useless repeated scheduled recording setting, and thus avoidance of use efficiency reduction of a recording medium or wasteful power consumption caused by useless scheduled recording.

Figure 5A:
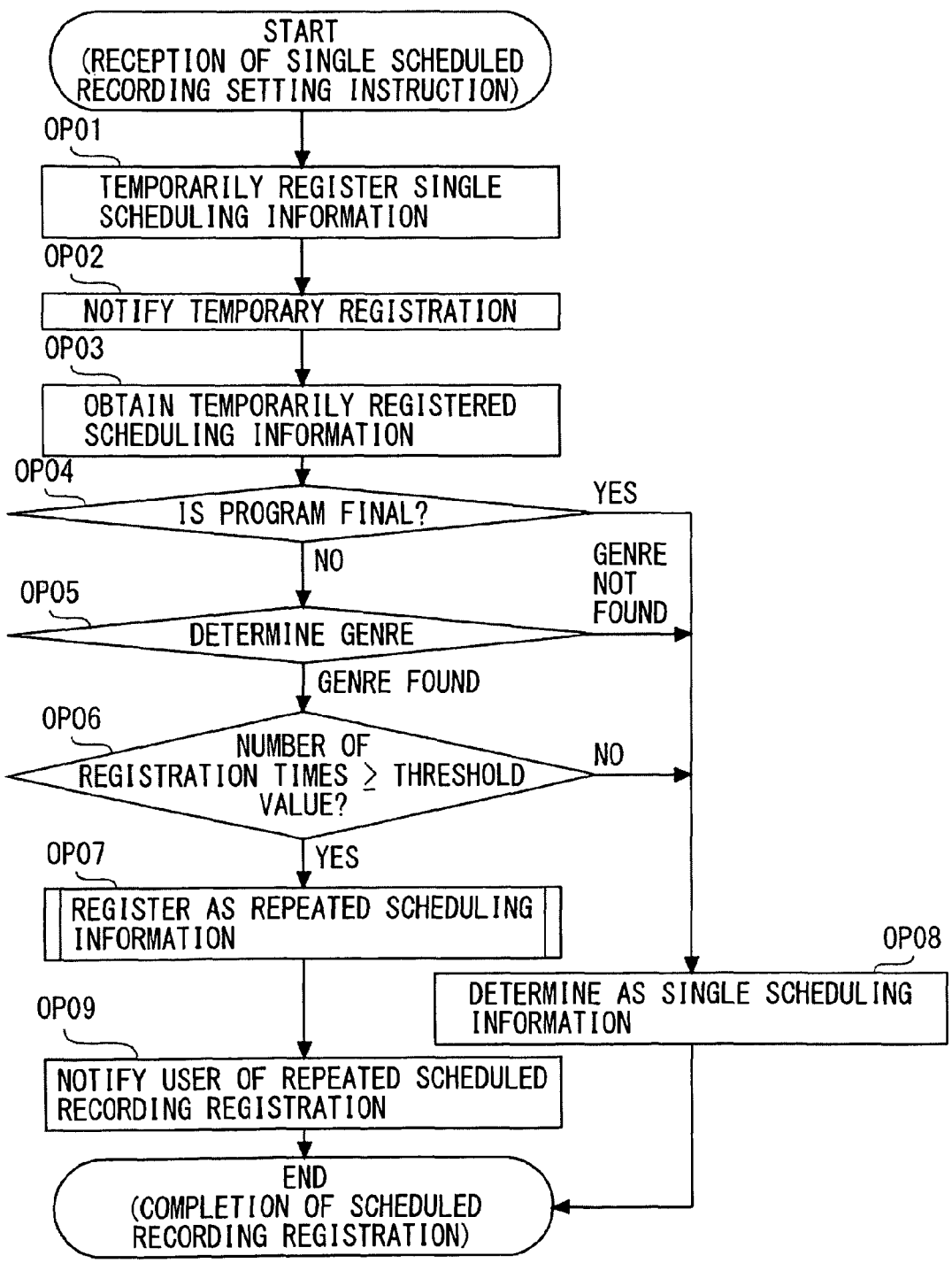
FIG. 5A is a flowchart illustrating a control flow of repeated scheduled recording automatic setting.
Figure 5B:
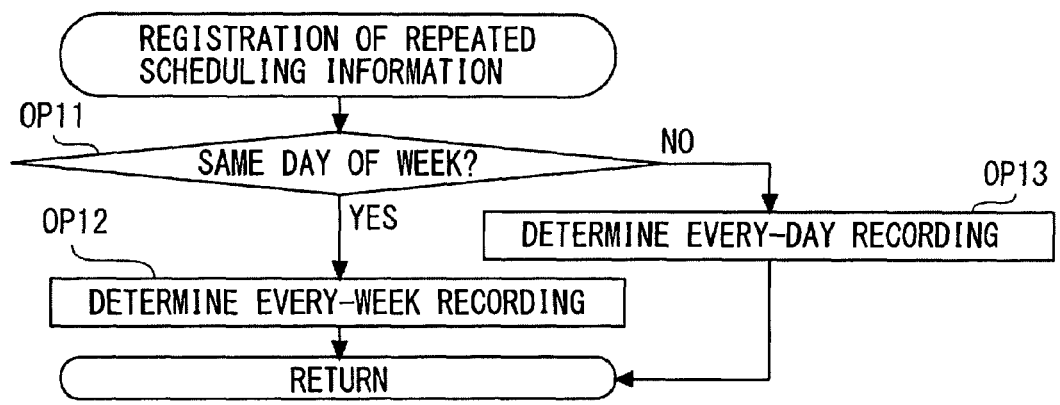
FIG. 5B is a flowchart illustrating a control flow of the repeated scheduled recording automatic setting.

Each of FIGS. 5A and 5B illustrates a control flow example of repeated scheduled recording automatic setting. The control flow will be described, when necessary, referring to FIGS. 2 to 4. A process shown in FIG. 5A is started when the CPU 11 (scheduling setting unit 31) receives a single scheduled recording setting instruction from the user (FIG. 2 (1)).

Scheduled recording setting instruction contains at least user's designation of a program of a scheduled recording target. After reception of the scheduled recording setting instruction, the scheduling setting unit 31 extracts information regarding the designated program from the program list data, and creates entries of scheduling information (scheduling information 34 of FIG. 2) to temporarily register them in a prescribed scheduling information storage area (OP01 and FIG. 2(2)). A flag of the temporarily registered scheduling information 34 takes a value indicating "SINGLE RECORDING" which is a default value.

The scheduling setting unit 31 notifies the repeated scheduling control unit 33 of a management number of the temporarily registered scheduling information in the scheduling information storage area, thereby notifying the temporary registration (OP02 and FIG. 2(3)).

Then, the repeated scheduling control unit 33 (CPU 11) accesses the scheduling information storage area to read the temporarily registered scheduling information 34 in the work area of the RAM 12 (OP03 and FIG. 2(4)).

The repeated scheduling control unit 33 determines whether the program registered in the scheduling information 34 is final (OP04). In other words, the repeated scheduling control unit 33 refers to the program information of the scheduling information 34 to determine whether information indicating that the program is final is contained. If the program is final (OP04; YES), the process proceeds to OP08. On the other hand, if the program is not final (OP04; NO), the process proceeds to OP05.

In OP05, the repeated scheduling control unit 33 identifies a genre of the program scheduled to be recorded in the scheduling information 34. In other words, the repeated scheduling control unit 33 refers to genre types of the program information contained in the scheduling information 34 to search for the genre in the threshold value list 36 by using the genre types as search keys (FIG. 2(5)).

If the genre of the scheduling information 34 is not found (not registered) in the threshold value list 36, the repeated scheduling control unit 33 determines that the genre of the scheduling information 34 is not a genre of a repeated scheduling control target (OP05; not relevant genre), and the process proceeds to OP08. On the other hand, if the genre of the scheduling information 34 is found in the threshold value list 36, the repeated scheduling control unit 33 obtains a threshold value (prescribed number of times) corresponding to the genre from the threshold value list 36 (FIG. 4).

The repeated scheduling control unit 33 accesses the scheduling registration history list 35 (FIG. 3) (FIG. 2(6)) to extract all records which a program name, a channel number, and a genre contained in the program information of the scheduling information 34 match, and to read them in the work area of the RAM 12. At this time, the repeated scheduling control unit 33 regards the number of extracted records as the number of registered pieces of scheduling information, and determines whether this number of registered pieces is equal to or more than the threshold value obtained from the threshold value list 36 (OP06).

If the number of registered pieces is less than the threshold value, the process proceeds to OP08. On the other hand, if the number of registered pieces is equal to or more than the threshold value, the repeated scheduling control unit 33 determines to switch the temporarily registered scheduling information to repeated scheduling information, and carries out a process of registering the repeated scheduling information (OP07).

FIG. 5B illustrates the process in OP07 in detail. In OP11 shown in FIG. 5B, the repeated scheduling control unit 33 obtains a day of a week from each extracted record while taking out a recording day of a week from the scheduling date-time information of the scheduling information 34 to determine whether all the days of the weeks are the same.

If all the days of the weeks are the same (OP11; YES), a program related to recording scheduling can be regarded as a program to be broadcast every week. Accordingly, the repeated scheduling control unit 33 determines to execute scheduled recording based on the scheduling information 34 every week (OP12). Then, the repeated scheduling control unit 33 accesses the scheduling information 34 in the scheduling information storage area to set a flag of the scheduling information 34 to a value indicating "EVERY WEEK RECORDING". Thus, a state is set where the repeated scheduling information of "EVERY WEEK RECORDING" has been registered in the scheduling information storage area. The process then proceeds to OP09 (FIG. 5A).

On the other hand, if not all the days of the weeks are the same (OP11; NO), the repeated scheduling control unit 33 regards the program related to the recording scheduling as a program to be broadcast every day (so-called daily program), and determines to execute scheduled recording based on the scheduling information 34 every day (OP13). Then, the repeated scheduling control unit 33 accesses the scheduling information 34 in the scheduling information storage area to set a flag of the scheduling information to a value indicating "EVERY DAY RECORDING". Accordingly, a state is set where the repeated scheduling information of "EVERY DAY RECORDING" has been registered in the scheduling information storage area. Then, the process proceeds to OP09 (FIG. 5A).

In OP09, the repeated scheduling control unit 33 notifies the user of the repeated scheduled recording registration. In other words, the repeated scheduling control unit 33 controls the display device 22 to display a notification screen (not shown) showing that the single scheduled recording setting instructed to be registered by the user has been registered as every-week or every-day repeated scheduled recording setting (repeated scheduling information) (FIG. 2(7)). Thus, the user can know that the single scheduled recording setting has automatically been changed to repeated scheduled recording setting to be registered. After an end of the process in OP09, the scheduled recording registration process is finished.

When the process proceeds to OP08 from one of OP04, OP05 and OP06, the repeated scheduling control unit 33 determines to define the temporarily registered scheduling information 34 as scheduling information regarding single scheduled recording setting. At this time, the repeated scheduling control unit 33 registers a record related to the temporarily registered scheduling information 34 in the scheduling registration history list 35 (FIG. 2(8)) to finish the scheduled recording registration process.

After the end of the scheduled recording registration process, the repeated scheduling control unit 33 notifies the scheduled recording control unit 32 of registration of new scheduling information or repeated scheduling information (FIG. 2 (9)). Accordingly, the scheduled recording control unit 32 recognizes the new scheduling information or repeated scheduling information. The scheduled recording control unit 32 refers to the registered scheduling information or repeated scheduling information (FIG. 2 (10)) to execute scheduled recording control based on the scheduling information for the receiver 19 or the recording/reproducing unit 17. However, in the case of a configuration where the scheduled recording control unit 32 monitors a situation of the scheduling information storage area as needed to automatically recognize new registration, the notification of the new registration (FIG. 2 (9)) is unnecessary.

According to the information recording apparatus (recording/reproducing apparatus 10) of the embodiment, when the number of registered pieces of single scheduling information reaches the threshold value or more, the single scheduled recording setting is automatically switched to the repeated scheduled recording setting.

Thus, even without any knowledge of a repeated scheduled recording setting method, the user can repeatedly carry out scheduled recording of a program (serial program) suited for repeated scheduled recording setting. In other words, with knowledge of a single scheduled recording setting method, the user can accordingly execute repeated scheduled recording setting. Thus, since operations which the user has to know are simplified, a load of learning the operation of the recording/reproducing apparatus 10 can be reduced for the user. Since the single scheduling information is automatically changed to the repeated scheduling information, no load of canceling the entered single scheduled recording setting is generated on the user.

For threshold values as criteria for switching scheduled recording setting, a plurality of threshold values corresponding to program genres are prepared. By varying the number of registering times for switching scheduled recording setting from one genre to another, the setting can be appropriately changed to repeated scheduled recording setting according to a program nature. In addition, unnecessary repeated scheduled recording setting registration is suppressed to enable prevention of use efficiency reduction of the recording medium and limitation of recording power consumption.

The embodiment employs specifications of notifying through a screen showing changing of the single scheduled recording setting to the repeated scheduled recording setting (OP09). In place of the specifications, a configuration may be employed where whether the user permits the changing is inquired on the screen, and the changing is carried out when the user permits it. Whether or not to obtain user permission may be optionally set.

The embodiment has been directed to the recording/reproducing apparatus capable of recording information on one of a plurality of types of recording media such as an HD, a DVD and a video tape. However, inclusion of at least one recording medium and a recording/reproducing apparatus (drive) is only required. As a recording medium, a Blue-ray Disk may be applied. As information recorded on the recording medium, the television broadcasting video and audio information have been taken as examples. However, the present invention can be applied to a recording/reproducing apparatus for radio broadcasting audio information, for example.

What is claimed is:

1. An information recording apparatus, comprising:
   a registration unit that registers scheduling information to schedule single recording of information provided periodically;
   a recording unit that records the information on a recording medium based on the registered scheduling information;
   a counting unit that counts a number of times of registering the scheduling information of the information;
   a determination unit that determines whether the number of times of registering the scheduling information of the information exceeds a predetermined threshold value; and
   a registering unit that generates, when the number of times of registering the scheduling information of the information exceeds the predetermined threshold value, repeated scheduling information to enable the recording unit to periodically and repeatedly record the information, and registers the repeated scheduling information in the registration unit.

2. A method of registering repeated scheduling information performed by an information recording apparatus that records information on a recording medium, comprising:
   registering scheduling information to schedule single recording of the information provided periodically;
   recording the information on the recording medium based on the registered scheduling information;
   counting a number of times of registering the scheduling information of the information;
   determining whether the number of times of registering the scheduling information of the information exceeds a predetermined threshold value; and
   generating, when the number of times of registering the scheduling information of the information exceeds the predetermined threshold value, repeated scheduling information to periodically and repeatedly record the information, and registering the repeated scheduling information.

3. A computer readable medium storing a computer program to be executed by a computer, the computer program executing the steps of:

registering scheduling information to schedule single recording of information provided periodically;

recording the information on a recording medium based on the registered scheduling information;

counting a number of times of registering the scheduling information of the information;

determining whether the number of times of registering the scheduling information of the information exceeds a predetermined threshold value; and generating, when the number of times of registering the scheduling information of the information exceeds the predetermined threshold value, repeated scheduling information to periodically and repeatedly record the information, and registering the repeated scheduling information.

4. The computer readable medium according to claim 3, wherein the information contains type information; and in the step of determining, by using one of a plurality of threshold values prepared according to the type information of the information, whether the number of times of registering exceeds the one of the threshold values is determined.

5. The computer readable medium according to claim 4, wherein the information contains video information of a serial program of television broadcasting; and the type information is information indicating a genre of the program.

* * * * *